A. H. EMERY.

HYDRAULIC-PRESS.

No. 7,790. Reissued July 17, 1877.

WITNESSES

Chas J. Cook

A. H. Galt

INVENTOR

Albert H. Emery

By Knight Bros Attorneys

UNITED STATES PATENT OFFICE.

ALBERT H. EMERY, OF NEW YORK, N. Y.

IMPROVEMENT IN HYDRAULIC PRESSES.

Specification forming part of Letters Patent No. 63,875, dated April 16, 1867; Reissue No. 7,790, dated July 17, 1877; application filed March 24, 1877.

DIVISION A.

*To all whom it may concern:*

Be it known that I, ALBERT H. EMERY, of the city, county, and State of New York, have invented certain new and useful Improvements in Hydraulic Presses, of which the following is a specification:

The invention relates to the employment or use of two concentric rams with separate inlets, through either of which the liquid may be admitted at will, and, further, to a construction and arrangement of packing inlets and their accessories, by which the invention is carried out.

Figure 1:
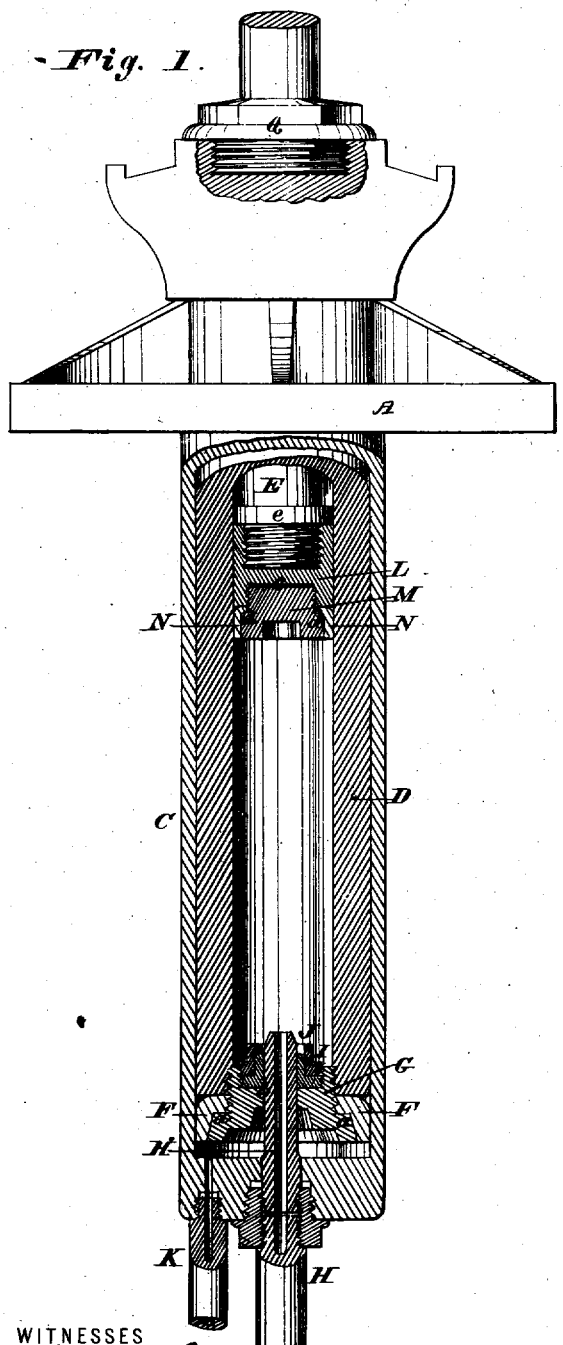
Figure 2:
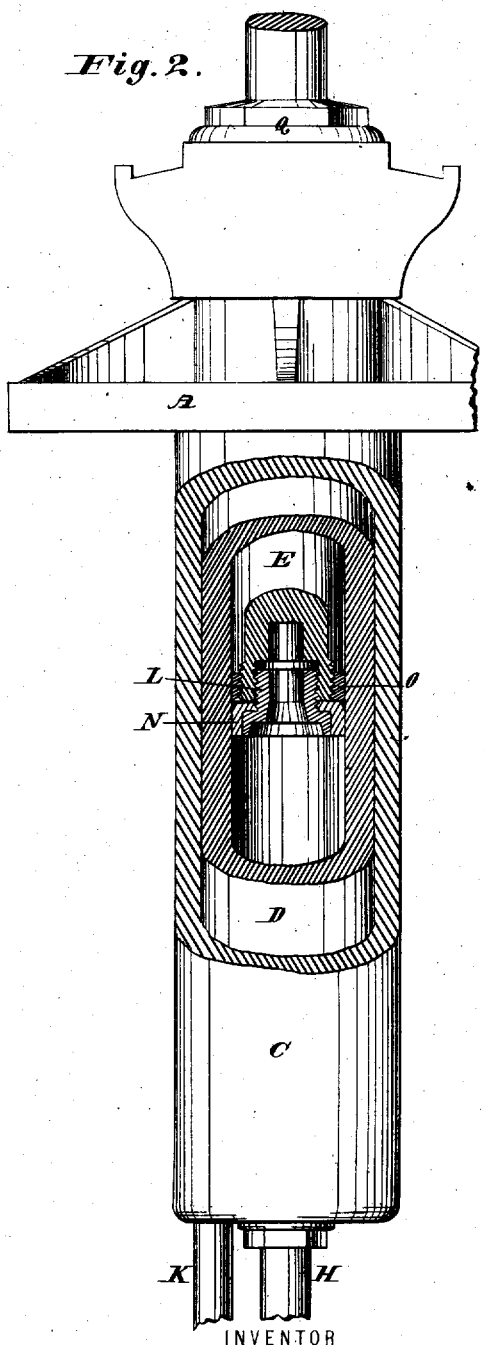

In the accompanying drawing, Figure 1 is a longitudinal section of the two concentric rams and their accessories. Fig. 2 is a sectional elevation illustrating a modification.

A represents a portion of the framing of the press, which may be constructed in any proper manner to insure strength and durability. C represents an upright cylinder secured in the lower part of the framing A. This cylinder is of cast-iron, closed at its bottom, and has fitted within it a cylinder, D, which is allowed to rise and fall freely, and constitutes a ram of heavy power. Within the cylinder D there is a rod or piston, E, constituting a ram of lighter power, the rod or ram E being allowed to rise and fall freely within D.

The lower end of the cylinder or ram D is closed, and allowed to work water-tight in the cylinder C by means of a packing, F, secured in position by a ring, G, which is screwed into the lower end of D, the packing F being clamped between a shoulder, *a*, on the ring, and the lower end of the ram D, as shown in Fig. 1. H is a water-supply pipe, which passes up through the bottom of the cylinder C, and through the ring G in the bottom of the compress-ram D, and the leakage of water around the pipe H and through the ring is prevented by a packing, I, which is fitted around the upper end of the pipe H, within a recess, *b*, in the upper surface of the ring G, and secured or clamped in position by a ring, J, screwed into the recess *b* of the ring G, as shown clearly in Fig. 1. K is a water-supply pipe, which communicates with the lower part of the cylinder C, as shown in Fig. 1.

The lower end of the ram E has a nut, L, screwed upon it, with a recess, *c*, in its under side to receive a cap, M, between a shoulder, *d*, on which, and the lower end of nut L, a packing, N, is secured or clamped by screwing up cap M. The upper end of the nut L abuts against a collar, *e*, on the rod or ram E, which collar serves as a stop, as will be hereinafter described.

A modification of this packing and stop is shown in Fig. 2, $N^{\times}$ being the packing, $L^{\times}$ the nut, which is screwed directly into the lower end of the rod or ram E, and O, a ring which is fitted on an external screw-thread on the lower end of the ram, the ring O serving as a stop in lieu of collar *e*. The upper end of the rod or ram E bears against the under side of the platen of the press, and it will be seen that when water is forced through the pipe H into the lower part of the inner cylinder D, the water will act against the ram E, and the platen will be raised until the stop *e* or O comes in contact with a nut, Q, in the head of the cylinder or ram D, at which time the ram D is made to rise by water entering the lower end of the cylinder C, through pipe K, and acting against the bottom of D.

A mode of connecting the two inlet-pipes H and K with a single supply through the medium of a valve, by which the water-pressure can be introduced through either inlet at will, I have described in another application.

Having thus described my invention, the following is what I claim as new and desire to secure by Letters Patent—

1. The combination of the fixed cylinder C, the independent supply-pipes H and K, and the two concentric rams D and E, the former constituting the cylinder of the latter, and supplementing the stroke of the latter with increased force, so that the sum of the strokes of the two rams may be imparted to the platen or other object to be moved.

2. The combination of the supply-pipe H, the packing I, moving with the cylinder D, and the separate ram, E working within the said cylinder D, as and for the purposes set forth.

3. The combination of the two sliding packings F and I, the packing-ring G, and the ram D, substantially as set forth.

ALBERT H. EMERY.

Witnesses:

OCTAVIUS KNIGHT,

JONATHAN EDWARDS.